July 21, 1970 V. PAGNOZZI 3,521,373
PROCESS AND PLANT FOR THE VACUUM DRYING OF WOOD
IN THE FORM OF PLANKS OR LATHS
Filed July 15, 1968
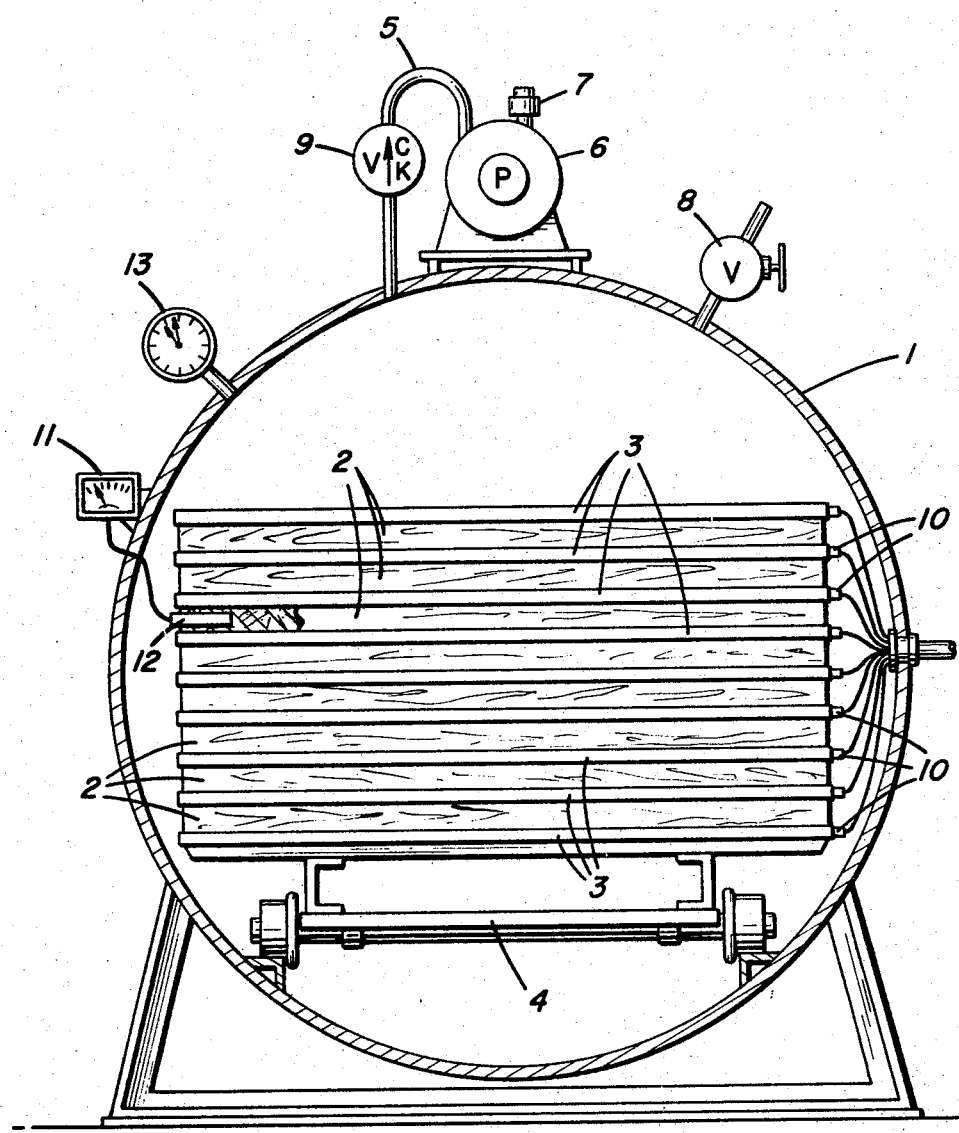
VINCENZO PAGNOZZI
INVENTOR
BY *Stevens, Davis, Miller & Mosher*
ATTORNEYS

United States Patent Office 3,521,373
Patented July 21, 1970

3,521,373
PROCESS AND PLANT FOR THE VACUUM DRYING OF WOOD IN THE FORM OF PLANKS OR LATHS
Vincenzo Pagnozzi, Ufficio Gaetano Capuccio, Via Venti Settembre 60, Turin, Italy
Filed July 15, 1968, Ser. No. 744,895
Claims priority, application Italy, July 20, 1967, 52,511/67
Int. Cl. F26b 5/04
U.S. Cl. 34—16.5      14 Claims

ABSTRACT OF THE DISCLOSURE

A method and apparatus for drying wood involving the arrangement of wood in stacked layers, the dry heating thereof, and the maintenance of controlled ambient pressure conditions so as to effect a controlled vaporization of moisture from internally of the wood to the surface thereof.

---

The present invention is concerned with processes and plants for the vacuum drying of wood in the form of planks or laths.

Various attempts have already been made to dry wood in a vacuum with a view to taking advantage of the fact that a vacuum greatly accelerates the evaporation of water and also tends to bring water from the centre of the wood to its surface. However, these attempts have been unsatisfactory, both with respect to the length of drying time required and to the quality of the wood after drying and the degree of dryness that can be attained. Some difficulties have, indeed, been overcome but many others remain to be solved if efficient vacuum drying of wood is to be achieved.

The first difficulty to be encountered lies in the fact that the use of a vacuum is not in itself sufficient to carry out the drying of wood (or, indeed, of any other substance), in that the intense evaporation that is produced under a vacuum has the effect of cooling the wood; as a result, evaporation ceases notwithstanding the vacuum. It therefore becomes necessary to apply heat to the wood. However, it is difficult to supply a sufficient quantity of heat to provoke evaporation since a vacuum is a very poor conductor of heat. For this reason, it has been sought to heat the wood before creating the vacuum by means of jets of water. The wood is then subject to the vacuum and the alternation of heating and vacuum is repeated several times in succession.

Yet, if this technique is proceeded with, there arrives a point at which the wood reaches saturation (i.e. its residual humidity is of the order of 30%) and, during the heating process, this leads to the condensation of humidity on the wood. This means that the wood re-acquires the humidity withdrawn during the vacuum treatment and the drying process comes to a halt; it is, therefore, impossible to get below a minimum humidity level. In addition, the humidity which condenses during the heating operation soaks the outer surfaces of the wood; these, in turn, tend to swell and then to shift with respect to the dryer inner layers. Tension is set up within the wood and deformation, collapse and cracking may result.

It is, in fact, well known that the principal forms of damage encountered in both natural and artificial drying of wood are attributable to differences in humidity that exist between the various parts of an individual plank or beam.

A further difficulty that stands in the way of the satisfactory vacuum drying of wood is that of achieving the uniform heating of the whole batch. Differences of temperature in the various planks that make up the batch mean that there are differences in evaporation and, at the end of the treatment, one part of the patch will be damper than the rest. A more serious problem, however, is presented by temperature differences within the same plank; in this case, the warmer parts dry to a greater degree than the rest and shrink further. Once again, this leads to deformation, collapse and cracking.

Laboratory tests so far carried out with small wood samples have, as a general rule, given satisfactory results. On the industrial scale, however, the results obtained with relatively small dryers (3–4 cu. m.) have been very contradictory: sometimes drying times are short and on other occasions they are inexplicably long; in some cases, the quality of the dried wood is good, in others it is very poor. This indicates that the equipment and the techniques that have been designed so far are incapable of offering a satisfactory solution to the problem of drying wood in a vacuum. It has, in general, been found possible to obtain good results with small batches of damp resinous wood, or with some kinds of hardwood, such as oak, whose initial dampness is low. This has led to the conclusion that single-stage vacuum drying cannot be employed for relatively large quantities of wood and must be restricted to some, or rather, to a very few types.

A second difficulty that is met in modern wood vacuum drying methods is that of the impossibility of controlling the drying process. Entry into the vacuum chamber is impossible without stopping the process and it is not possible to rely upon the condition of one or a few samples as a means of determining a general mean value; this is, of course, a result of plank variations, as has already been explained.

Evaluation of the length of drying time required is therefore essential and this presents considerable difficulty in practice, since it is not possible to predict the degree of residual humidity that the wood will possess after the dryer has been in operation for a given time.

These various considerations lead to the conclusion that the problem of vacuum drying has reached a stage where no further progress is possible.

The reason for this lack of success must be sought in the fact that the processes so far devised have tended to ignore the effect of many phenomena; these, being not subject to control, have caused irreparable damage in wood in the course of being worked, inexplicable halting of the drying process and inconsistency in the final results.

The object of the present invention is that of controlling, without opposing, the phenomena which appear in wood during drying, the aim being to convert into advantages the very difficulties and disadvantages that are at present encountered in modern drying techniques. As an example, the invention proposes, by exploiting heat inertia with respect to its propagation through the thickness of the plank, to use the cooling produced by evaporation as a means of arresting the drying of those parts of the plank which tend to dry more rapidly than the rest; by regulating the value and the period of pressure decrease, the present invention produces states of thermal disequilibrium in the thickness of each plank and thus causes water to migrate from its more difficult to dry internal parts to the more easily dried outer parts; by dampening the parts of the plank that tend to dry more quickly, the present invention is designed to make use of the water vapour that comes from the other parts so as to cut out the wasteful technique of soaking the wood with steam coming from an outside source, such water then requiring removal together with the water already in the wood in its natural state, and so as to cut out the need for steam generators.

A further object of the present invention is that of reaching any desired degree of dryness by means of the vacuum drying process.

Yet another object of the present invention is that of making it possible to dry any desired quantity of wood by means of the vacuum drying process, in a single operation.

Another object of the present invention is that of rendering the various stages of the drying process both cyclical and constant, irrespective of the thickness of the planks and of the initial humidity of the wood, in order that the whole series of operations may be readily automated.

A further object of the present invention is that of achieving a virtually constant drying rate throughout the whole of the drying operation. The resulting drying law will thus be linear in function of time and in this respect will be very different from the rapidly decreasing law associated with known drying processes, and with vacuum drying in particular; the result of this improvement will be that drying times can be expressed in terms of hours instead of the days required by conventional processes.

A still further object of the present invention is that of enabling the drying process to be checked by means of the reading of measuring instruments located outside the dryer.

To achieve the above-mentioned objects, together with others that will become apparent during the course of the description immediately following, the present invention has as its subject a process for the vacuum-drying of wood in the form of planks or laths characterised by the fact that it includes the following operations, that is to say:

(A) The dry heating of the wood by means of flat thermostatically controlled heating elements inserted between the planks, or by means of a non-soaking fluid, heated to a certain operating temperature and made to skim over the surface of the planks, so as to bring the temperature of the internal parts of the said planks to a temperature virtually equal to that of the said heating elements or non-soaking fluid;

(B) The subjection of the wood to the action produced by a vacuum by means of lowering the working pressure to a value below the surface tension value of the saturated water vapour corresponding to the temperature reached by the internal parts of the planks;

(C) The continuation of the said vacuum treatment for at least as long as the temperature of the internal parts of the planks, although decreasing as a result of cooling due to the evaporation of water, still remains higher than the temperature value which corresponds to the tension value of the saturated water that is equal to the working pressure.

As a result of a further characteristic of the present invention, the dry heating operation described in section (A) above is carried out during the time in which the vacuum action is either arrested or diminished, whereas the vacuum treatment referred to in sections (B) and (C) above is carried out during the arrest of the said dry heating process.

In addition, the dry heating operation, in conditions of no-vacuum or of diminshed vacuum value, and the said vacuum treatment during the arrest of dry heating, can be repeated several times, alternately and in the manner of a cycle, in order that the temperature of the internal parts of the wood shall tend to remain constant during the vacuum treatment.

Additional features and advantages of the present invention will appear in the course of the following detailed description, in which reference is made to the attached drawing. The said drawing illustrates an example of a plant for carrying out the process which is the subject of the present invention, as seen in transverse section.

With reference to the said drawing, at 1 is shown a horizontal, cylindrical, closeable container, in which planks 2 of wood are inserted in such a way as to be placed in successive layers, the said layers alternating with flat thermostatically controlled heating elements 3. The pile formed by the planks 2 and the interlaid heating elements 3 is mounted on a trolley 4 to facilitate the insertion and removal of the wood into and out of the container 1.

The inside of the container 1 communicates with the suction pipe 5 of a vacuum pump 6, the delivery side 7 of which is open to the ambiental air. The container 1 itself communicates with the ambiental air by means of a valve 8, the opening of which can be regulated.

A one-way valve 9 is fitted to the suction pipe 5 and prevents external air from flowing into the container 1 when the said container 1 is in a state of vacuum.

The heating elements 3 are composed of metal plates with built-in electrical resistances. Each of the said resistances is supplied with an adjustable thermostat 10.

On the outside of the container 1, the dial 11 of a probe thermometer is attached, the bulb 12 of the said probe thermometer being inserted in a deep hole fashioned in one of the planks 2, the said plank being selected as a sample.

The internal pressure of the container 1 is determined by means of a vacuum gauge 13.

The drying process begins with the heating of the wood. Electric current is supplied to the resistances inside the heating elements 3, the temperature of the thermostats 10 having been previously set to the desired value.

The choice of the said value will, in essence, depend on the quality or type of the wood that is to be dried: for local forest woods or cheap woods, such as poplar, a temperature higher than 100° C., for example 120° C., can be chosen; for very delicate wood, such as some of the exotic types, a very low temperature value, for example 20° C., must be selected.

When it is borne in mind that, by increasing the temperature to a considerable degree, only a few hours will be saved on the drying process, it is clearly advisable to work at medium temperatures; this will avoid the formation of dark spots on the surface of the wood.

Tests carried out on many samples of numerous types of wood over the temperature range suggested above, i.e. 20–120° C., have indicated the advisability of restricting the working range to 50°–80° C. Temperatures falling within this relatively limited range are able to satisfy the dual requirements of rapid drying and non-interference with the colour of the wood.

The heating operation is carried out at atmospheric pressure by leaving open the valve 8.

When the temperature of the internal parts of the planks, as read off from the dial 11 of the thermometer, reaches a value that is a little below that selected for the calibration of the thermostats 10, the heating operation is arrested by switching off the current to the heating elements 3. In practice, the said heating operation is discontinued when the temperature of the internal parts of the planks (as indicated by the dial 11) exceeds 60% of the value selected for the thermostats 10.

The quality of the wood after drying is closely dependent on the above-described condition governing the suspension of heating and, in fact, the said quality is higher the closer the temperature of the internal parts of the planks is allowed to come to that pre-set on the thermostats 10, before the said heating process is discontinued; the reasons for this result are explained below.

However, to avoid excessive heating times, it is better to arrest the heating operation before the temperature of the internal parts of the planks reaches 95% of the value selected for the calibration of the thermostats 10. From what has been said so far, it will be clear that the following condition applies: the termination of the heating operation will take place when the difference between the temperature selected for the thermostats 10 of the heating elements 3 and the temperature reached by the internal parts of the planks is between 5% and 40% of the said temperature chosen for the thermostats 10.

As a result of the resistance to the propagation of heat through the thickness of the wood, the temperature distribution at the outset of the heating operation decreases sharply from the outside surface to the internal parts of the planks; the differences in temperatures thus observed, however, tend to decrease as the heating operation continues until, at the conclusion of the heating operation, the temperature of the internal parts of the planks is close to that of the heating elements and the entire pile of wood is at virtually the same temperature. Immediately after the suspension of the heating operation, the pump 6 is set in motion, the valve 8 is closed and the wood is subjected to a vacuum condition.

The working pressure thus achieved can be regulated, either by opening the valve 8 or by stopping the motion of the pump 6, in order that the said working pressure may be kept to a value below the surface tension value of the saturated water vapour corresponding to the temperature reached by the internal parts of the planks.

During the first stage of the vacuum treatment, violent evaporation takes place at the surface of the planks with the result that the temperature of the said surface falls rapidly and reaches the value that corresponds to the tension of the water vapour equal to the working pressure in the container; at this point, evaporation at the surface of the planks ceases.

The water contained in the internal parts of the planks cannot evaporate easily since it is trapped between poorly permeable walls; for this reason, the said internal parts cool slowly due to the effect of evaporation.

On account of the inertia displayed by the heat in passing from the internal parts to the now cooler external part of the planks, there is at first a difference of temperature between the surface and the internal parts of the planks, the former being at a lower temperature.

It is essential to continue with the vacuum treatment so as to obtain the three following conditions, all of which are of fundamental importance:

(1) The drying of a substantial thickness of the surface of the planks;

(2) The prolonging of the duration of the period during which there is a temperature difference between the internal and the external parts of the planks;

(3) The cooling of the surface of the planks so that its temperature may fall to the dew point of the water vapour at the working pressure in the container.

The first two conditions cause a flow of water direct from the heart of the plank to its outer limits as a result of the tendency of water to move from wet to dry parts, a hygroscopic effect, and from hot to cold parts, a thermal effect.

The third condition occurs while evaporation is still gong on in the internal parts of the planks, which are still hot, and causes the condensation of the vapour coming from the internal parts.

The quantity of this flow of water, produced by a double hygroscopic and thermal effect, is greater than that of the contrary flow, this being solely due to the thermal effect, which takes place during the heating operation.

The overall effect of the three above-mentioned conditions is that the water contained in the wood itself is used to dampen the surface of the planks, the said surface having a tendency to dry more rapidly. There is a gradual levelling-out of the temperature difference between the various parts of each plank and the movement of water from the inside to the outside of the planks is encouraged.

In damp planks, the vacuum treatment is effective during the whole of the time in which the temperature of the internal parts, though falling as a result of evaporation, still remains higher than the dew point corresponding to the working pressure.

The numerous tests that have been carried by measuring the temperature of the internal parts of the planks, by means of a thermometer inserted in holes bored in the planks at the moment of measurement, have shown that the said time is essentially dependent of the thickness and humidity of the planks, but is practically unaffected by the type of wood being treated.

A little after the commencement of the vacuum treatment of damp planks, there is a very clear temperature fall. On the dial 11 of the probe thermometer, the needle will be seen to drop rapidly and then halt at a certain minimum value. The said thermometer registers the temperature of the internal part of the sample plank in which its sensitive bulb 12 is inserted during the heating operation and, during the vacuum treatment, measures the temperature at the surface of the wall of the hole in which it is inserted, the said hole communicating with the outside. However, the length of the period during which the above-mentioned rapid fall of the needle of the probe thermometer occurs serves as a useful index of the effective duration of the vacuum treatment. In practice, the length of the said treatment is set between 2 and 40 times the length of time taken for the temperature recorded by the said thermometer to fall rapidly, on the first occasion in which the wood is subjected to the vacuum.

For planks of small thickness (e.g. of the order of 10 mm.), the period selected for the vacum treatment will be at least double that required for the said rapid temperature fall to take place on the first occasion; for larger thicknesses (of the order of 100 mm.), the vacuum treatment period will be 40 times as long as the said temperature fall period.

In the case of intermediate thicknesses, a linear relationship must be interpolated.

When the first vacuum treatment has been carried out for the selected period, the valve 8 is opened so as to bring the wood to, or near to, conditions of atmospheric pressure; the heating operation is then repeated in the same way as has been already described.

The vacuumless or the reduced vacuum heating operation, and the vacuum treatment without heating age repeated alternately on several occasions and in the form of a cycle.

As the drying process continues, it will be found that the temperature of the planks registered by the thermometer falls less and less with each vacuum treatment. Eventually, when all the moisture has been removed from the wood, no further temperature fall will be observed and this denotes that the drying process has come to an end.

In theory, it would be possible to reduce the time of each succeeding vacuum treatment as the wood became drier and drier. In practice, however, it is not worth while to change the time from that worked out for the initial vacuum treatment; in this way, one can be sure that evaporation will take place in depth throughout the thickness of the wood.

The heating operation can also be carried out by means of plates which incorporate pipes containing a circulating hot fluid, for example hot water or steam, at a constant temperature. In this case, the working temperature of the plate can be governed by a thermostatic control situated outside the container 1; in addition, the said pipes can also be made to carry a cold fluid during the interval between a heating operation and its subsequent vacuum treatment, or even during the vacuum treatment itself, the object being to cool the surface of the wood so as to check, if necessary, evaporation taking place at the surface of the planks and enhance the condensation of humidity on the said surface.

To prevent unnecessary removal of heat from the wood, it is normally advantageous to restrict the cooling of the said plates in such a way that their temperature is substantially equal to that previously attained by the internal parts of the planks.

When these working conditions are employed, the temperature difference between the internal and the external parts of each plank can be reduced to the indispensable minimum required to assist the outward movement of the moisture and, in any event, the tendency for there to be a high degree of superficial evaporation can be prevented.

Heating can also be achieved by using a non-soaking hot fluid, such as air or superheated water vapour, or a mixture of air and superheated water vapour, the said fluid being kept at a constant temperature. If this technique is employed, the planks will be kept apart by distance pieces so that interspaces are formed in which the heating fluid can be continuously passed, the said fluid being recycled through the closed circuit formed by the said interspaces and a thermostatically-controlled heat exchanger.

The said hot fluid is introduced into the container 1 at the start of each heating operation and, at the end of the same, is discharged to the outside of the system.

Even though saturated water vapour is not being introduced, closed-circuit circulation quickly leads to the humidification of the said heating fluid due to the moisture leaving the surface of the wood; in consequence, the said heating fluid becomes saturated during the closed-circuit heating operation and thus prevents the unwanted rapid drying of the surface of the planks.

The subsequent vacuum treatment produces a substantially uniform evaporation of moisture from the whole mass of the wood.

If, at the end of the heating operation, an excessive difference in temperature between the internal and the external parts of the planks is observed—this will occur when it is desired to halt the heating operation long before the internal parts of the planks reach the same temperature as that of the above-described heating fluid—it is possible to cool the said external part of the planks, before commencing the vacuum treatment, by circulating a cold fluid in the interspaces between the planks so as to reduce or cancel out the said excessive difference in temperature.

By enhancing the action of this cooling fluid, one can slow down superficial evaporation and also, during the subsequent vacuum treatment, condense on the surface of the planks the moisture leaving the internal parts of the same.

If the above-mentioned heating-fluid heating method is employed, it is once again advantageous to ensure that the temperature reached by the internal parts of the planks during the heating operation is kept within 5% and 40% of the respective temperature of the said hot fluid.

With the process according to the present invention, the formation of humidity on the outside of the planks is prevented, on all occasions when the same is not required, by the fact that a dry heating process is employed. At the conclusion of each drying operation, the temperature distribution is substantially uniform throughout the whole batch; in practice, therefore, the physical conditions of pressure and temperature are identical throughout the whole of the mass of the wood at the commencement of each vacuum treatment. Slight temperature and humidity differentials are produced by evaporation after the start of each vacuum treatment, but these then tend to level out automatically as the vacuum treatment proceeds.

The fact that virtually the same physical conditions are present with respect to all the planks in the batch at every moment of the drying process means that any quantity of wood can be dried at a time and that the disadvantages to which was made at the outset of the present specification will not be encountered.

The drying process can easily be checked from outside by means of the probe thermometer. The various operations of the process according to the invention are constant and form a cycle so that their automation can readily be achieved.

What is claimed is:

1. A process for drying wood, comprising:
    (a) dry heating wood to a predetermined temperature;
    (b) measuring the temperature of the internal portion of the heated wood and lowering the ambient atmospheric pressure conditions to below the surface tension of saturated water vapor at the temperature of said internal portion; and
    (c) permitting the wood to cool through the vaporization of water therefrom and repeating step (b) for at least as long as the temperature of said internal portion is higher than the saturated water vapor temperature at a surface tension corresponding to the ambient atmospheric pressure.

2. The process of claim 1, said dry heating being effected without changing the ambient pressure conditions and being discontinued while step (b) is being carried out.

3. The process of claim 2, wherein steps (a) and (b) are alternately repeated in cyclic fashion until the internal wood temperature tends to remain unvaried during a subsequent step (b).

4. The process of claim 1, said dry heating being effected by a heating medium whose temperature is in the range of 20 to 120° C.

5. The process of claim 4, said temperature of the heating medium being in the range of 50 to 80° C.

6. The process of claim 4, wherein each cyclic commencement of step (b) and the corresponding termination of step (a) are made to occur when the temperature of the internal portion of the wood is from 5 to 40% of the temperature of the heating medium.

7. The process of claim 1, wherein the wood is maintained under the aforementioned reduced pressure conditions for a period of time such as to realize a discernible rapid decrease in the wood internal temperature.

8. The process of claim 7, wherein the wood is maintained under the aforementioned reduced pressure conditions for a period of time of from 2 to 40 times the period of time it takes for the first rapid internal temperature decrease to occur in the wood.

9. The process of claim 1, wherein the wood is in the form of flat pieces stacked in layers alternately with layers of flat heating elements, said process being carried out in a sealed autoclave.

10. The process of claim 1, wherein the wood is in the form of flat pieces stacked on top of each other in layers which are spaced apart from each other, the heating medium being a heated non-wood-wetting fluid which is made to flow between said layers, said process being carried out in a sealed autoclave.

11. The process of claim 10, said fluid being selected from the group consisting of air, superheated water vapor, or a combination of air and superheated water vapor.

12. The process of claim 1, including the step of cooling the surface portions of the wood at some point following the heating of the internal portions thereof.

13. An arrangement for drying wood, comprising: a plurality of flat heating elements arranged in superimposed spaced apart layers adapted to receive respective layers of wood therebetween, and including temperature measuring means for sensing and indicating temperatures internally of such wood layers.

14. The arrangement of claim 13, including a closed autoclave surrounding the layers of heating elements and including vacuum producing means for controlling the ambient pressure in said autoclave.

References Cited

UNITED STATES PATENTS

| | | | |
|---|---|---|---|
| 1,197,097 | 9/1916 | Banks | 34—9.5 |
| 1,333,848 | 3/1920 | Jacobs | 34—16.5 |
| 1,778,079 | 10/1930 | Kristensson | 34—16.5 |
| 2,296,546 | 9/1942 | Toney | 34—16.5 |
| 3,135,589 | 6/1964 | Stokes | 34—5 |
| 3,259,991 | 7/1966 | Illich | 34—5 |
| 3,271,874 | 9/1966 | Oppenheimer | 34—5 |

FOREIGN PATENTS

| | | |
|---|---|---|
| 141,727 | 1/1921 | Great Britain. |
| 94 | 1912 | Great Britain. |
| 478,341 | 1938 | Great Britain. |

WILLIAM J. WYE, Primary Examiner

U.S. Cl. X.R.

34—9.5, 13.8, 92